Patented July 3, 1945

2,379,654

UNITED STATES PATENT OFFICE 2,379,654

PROCESS OF DESULPHURIZING HYDROCARBONS

Leslie W. Royer, Pawhuska, Okla., assignor to Skelly Oil Company, Tulsa, Okla.

No Drawing. Application December 3, 1941, Serial No. 421,527

6 Claims. (Cl. 196—27)

Distillation products from crude oil usually contain sulphur in the following forms: (1) hydrogen sulphide, (2) elementary or free sulphur, (3) mercaptan sulphur, and (4) thiophene and organic sulphides. The first three groups are usually removed or changed by the refiner in order to make the product more saleable. Hydrogen sulphide and free sulphur can be easily and economically removed by contacting the distillate with caustic or sodium sulphide solution. The mercaptans are a more serious problem and it is with these and the latter group of sulphur compounds that my invention is chiefly concerned.

It is the custom of refiners to improve the odor of distillates by changing the mercaptan sulphur to a more odorless form, as by oxidizing to the disulphide. This oxidation is brought about by various treating processes, the most common being the plumbite or doctor process, the copper process and the hypochlorite process. All of these processes are basically unsatisfactory because they do not remove the mercaptan. These processes have a basic disadvantage from the standpoint of maximum improvement of product, in fact the mercaptan sulphur is not removed but merely converted to another form of sulphur, which may be less objectionable, but which remains in solution in the finished products in much the same weight proportions as existed in the original untreated material. The term, "stable," is used to indicate resistance to decomposition and gum formation or cloudiness in the stored gasoline.

Description of process

The purpose of this invention is to furnish a new and better method of treating hydrocarbon distillates by which all of the mercaptans and most other organic sulphur combinations are removed from the oil. The treatment of the gasoline or other hydrocarbon oil consists merely of vaporizing the oil, superheating by any convenient means to a temperature between 600 and 875° F. and passing the superheated vapors through a bed of alkaline carbon, preferably in sized particles presenting maximum surface area and allowing efficient gas passage without packing or channeling. Contact of the superheated vapors with the alkaline carbon results in the conversion of mercaptans and other organic sulphur combinations to hydrogen sulphide which may be removed by any convenient means such as fractionation or caustic washing the condensed vapors. The conversion of the mercaptans and other sulphur combinations and the subsequent removal of the hydrogen sulfide promotes a substantial reduction in the quantity of sulphur in the oil and an improvement in its quality.

When the process is operated in this manner, it is necessary to shut down the treater periodically and regenerate the catalyst by passing superheated steam into the bed, thereby removing adsorbed hydrogen sulphide. This periodic regeneration can be avoided by adding 10 to 20% (liquid volume) of superheated steam to the charge stock before the catalyst is contacted. Introduction of steam with the stock to be treated keeps the carbon practically free of hydrogen sulphide and assures peak catalyst efficiency at all times.

The contact temperature may vary from 572° F. to 875° F. and will depend on the type of oil to be treated and the degree of desulphurization to be achieved. All of the mercaptans may be removed from some stocks at 600° F. while others may require a contact temperature as high as 775° F. When it is desired to remove all of the mercaptans and in addition, most other organic sulphur combinations, the higher temperatures are recommended. For example, a high sulphur straight run gasoline (free of hydrogen sulphide and elementary sulphur) containing 0.067% mercaptan sulphur and 0.140% total sulphur was contacted at 750° F. and at 850° F. The lower temperature yielded a doctor sweet product containing 0.04% total sulphur while the higher reduced the total sulphur to 0.006%.

Ordinarily a throughput of 500 bbls. of oil per ton of catalyst per day (contact time about 13 seconds) is quite satisfactory, but this rate may be altered to give the most economical performance for any given charge stock. Longer contact time gives greater sulphur reduction.

The operating pressure need not be higher than that necessary to condense the treated product upon cooling. For example, ordinary straight run gasoline may be satisfactorily treated at gage pressures below 10#, while a more volatile product such as natural gasoline may require 20# to 30# for satisfactory operation. The process is not sensitive to changes in pressure.

The carbon or charcoal catalyst is a cheap material which is non-corrosive and is extremely long-lived. For best results, it should be naturally alkaline, which means that it probably contains traces of either potassium carbonate or potassium hydroxide. Neutral carbons can be activated with potassium or sodium carbonate or some other suitable alkaline agent. The carbon particles should be fine enough to provide a large contacting surfaces and coarse enough to prevent excessive packing. 4–10 mesh is quite satisfactory.

Advantages of the process

Since this proposed process removes the mercaptan sulphur together with varying portions of other organic sulphur combinations, the total sulphur in any given oil is considerably reduced. This sulphur reduction, which usually amounts to removal of 50% to 96% of the total sulphur present, makes the gasoline more susceptible to tetra ethyl lead when used for motor fuel and will actually result in a substantial saving of tetra ethyl lead, depending on the sulfur content of the untreated oil and the octane number to be achieved. This sulphur reduction is also very desirable in solvent production because the desulphurized product will have a good odor, will be color stable and pass the strenuous corrosion tests such as the Sipes, which are sometimes imposed by the paint and varnish industries and others where the solvent must withstand long periods of heating without decomposition.

Another advantage of this process is the color of the product which under normal operation will be approximately equal to that of the untreated oil.

The process presents no special corrosion problems for the most corrosive element present is the hydrogen sulphide which is very common around all refineries. This, coupled with the low operating pressure, make special equipment unnecessary, and enables the refiner to utilize old or reclaimed vessels which happen to be available.

The process is simple and economical and should be attractive to gasoline and solvent manufacturers.

Heretofore, it has been proposed to use carbon as a catalyst for the vapor phase treatment of hydrocarbon oils with steam or water vapor at 500° C.–600° C. (932° F.–1112° F.) with a resulting hydrogenation of unsaturated hydrocarbons and sulphur compounds. Therefore, my invention may be considered to be an improvement on the known processes in which other carbons are employed for desulphurization purposes. My improvement resides mainly in the discovery that alkaline carbon, as described herein, is a much more effective and advantageous catalyst for the desulphurization reaction than the carbons heretofore proposed. For example:

Alkaline carbon permits more economical operation. The operating temperature is lowered from 500° C.–600° C. (932° F.–1112° F.) to 300° C.–468° C. (572° F.–875° F.) and the required steam is reduced from 2¾ volumes of water per volume of oil to 0.1 to 0.2 volume of water per volume of oil, which changes make a very substantial fuel saving and promote longer catalyst life.

Alkaline carbon yields a superior product. Because of the relatively low operating temperature, there is no decomposition by cracking or lowering of the color of the treated oil. The mercaptans are completely converted to hydrogen sulphide so that the caustic washed product is doctor sweet, thereby eliminating the necessity of additional treatment with sodium plumbite or copper solution; and where desirable, a much greater sulphur reduction (up to 96% or more) can be achieved by the proposed process.

Alkaline carbon permits greater flexibility of operation for it does not require that the steam and oil be added simultaneously to the hot carbon. Where more convenient, the oil may be treated without steam and the catalyst periodically regenerated by a separate steaming operation.

The use of alkaline carbon as a desulphurization catalyst allows many worthwhile improvements which should make the process acceptable as a commercial refining operation.

It is my belief that the process will function with any hydrocarbon compound or mixture in the vapor phase. This would include the normally gaseous compounds and mixtures of such, as well as liquids that may be vaporized within the temperature limits set forth in the appended claims.

While the process herein disclosed constitutes a preferred method of procedure, it is to be understood that my invention is not limited to such precise method, and that changes may be made in the procedural steps and hydrocarbon mixtures treated without departing from the scope of the invention defined in the following claims.

What I claim and desire to secure by Letters Patent is:

1. A process of desulphurizing liquid hydrocarbon distillates which comprises passing the distillate in vapor phase through a bed of a catalyst consisting of carbon containing alkaline material at temperatures ranging from 572° F. to 875° F., pressure sufficient to condense the distillate upon cooling, and for a time sufficient to completely convert the mercaptans and a substantial portion of other organic sulphur combinations to hydrogen sulphide, and subsequently removing from said distillate the hydrogen sulphide generated in such vapor phase treatment.

2. A process of desulphurizing liquid hydrocarbon distillates, which comprises passing the distillate in vapor phase and in admixture with steam through a bed of a catalyst consisting of carbon containing alkaline material, at temperatures ranging from 572° F. to 875° F., at pressures ranging from 0 to 30 pounds pressure gauge, and for a period of time sufficient to convert the mercaptans and a substantial portion of other organic sulphur combinations to hydrogen sulphide, and subsequently removing from said distillate the hydrogen sulphide generated in such vapor phase treatment.

3. A process of desulphurizing liquid hydrocarbon distillates which comprises contacting the distillate in vapor phase with a catalyst consisting of carbon containing alkaline material, at temperatures ranging from 572° F. to 875° F., a pressure ranging from 0 to 30 pounds pressure gauge, and for a period of time sufficient to convert the mercaptans and a substantial portion of other organic sulphur combinations to hydrogen sulphide, and subsequently removing from said distillate the hydrogen sulphide generated in such vapor phase treatment.

4. A process of desulphurizing liquid hydrocarbon distillates which comprises contacting the distillate in vapor phase and in the presence of superheated steam with a catalyst consisting of carbon containing alkaline material, at temperatures ranging from 572° F. to 875° F., at a pressure ranging from 0 to 30 pounds pressure gauge and for a period of time sufficient to completely convert the mercaptans and a substantial portion of other organic sulphur combinations to hydrogen sulphide, and subsequently removing from said distillate the hydrogen sulphide generated in such vapor phase treatment.

5. A process of desulphurizing liquid hydrocarbon distillates which comprises passing the distillates in vapor phase and in admixture with steam through a bed of a catalyst consisting of charcoal containing alkaline material, at a temperature ranging from 572° F. to 875° F., at pressures ranging from 0 to 30 pounds pressure gauge, and for a period of time sufficient to convert the mercaptans and a substantial portion of other organic sulphur combinations to hydrogen sulphide, and subsequently removing from said distillate the hydrogen sulphide generated in such vapor phase treatment.

6. A process of desulphurizing liquid hydrocarbon distillates which comprises contacting the distillate in vapor phase with a catalyst consisting of charcoal containing alkaline material, at temperatures ranging from 572° F. to 875° F., at pressures ranging from 0 to 30 pounds pressure gauge, and for a period of time sufficient to convert the mercaptans and a substantial portion of other organic sulphur combinations to hydrogen sulphide, and subsequently removing from said distillate the hydrogen sulphide generated in such vapor phase treatment.

LESLIE W. ROYER.